United States Patent [19]

McVey et al.

[11] 4,208,605

[45] Jun. 17, 1980

[54] ALUMINA, CALCIA, BARIA SEALING COMPOSITION OPTIONALLY MODIFIED WITH $B_2O_3$

[75] Inventors: Charles I. McVey, Shaker Heights; Ranajit K. Datta, East Cleveland, both of Ohio

[73] Assignee: General Electric Company, Schenectady, N.Y.

[21] Appl. No.: 26,021

[22] Filed: Apr. 2, 1979

Related U.S. Application Data

[63] Continuation-in-part of Ser. No. 851,439, Nov. 14, 1977, abandoned.

[51] Int. Cl.$^2$ ................... C03C 3/00; C03C 3/30; H01J 17/18; H01J 61/36
[52] U.S. Cl. ................... 313/221; 106/47 R; 428/432; 428/433; 428/472
[58] Field of Search ............ 106/47 R; 313/220, 221, 313/317; 428/472, 433, 432

[56] References Cited

U.S. PATENT DOCUMENTS

| | | | |
|---|---|---|---|
| 3,469,729 | 9/1969 | Grekils et al. | 106/47 R |
| 3,480,823 | 11/1969 | Chen | 313/317 |
| 3,588,577 | 6/1971 | McVey et al. | 313/317 |
| 3,852,079 | 12/1974 | Davis | 106/47 R |

*Primary Examiner*—O. R. Vertiz
*Assistant Examiner*—Mark Bell
*Attorney, Agent, or Firm*—Ernest W. Legree; Lawrence R. Kempton

[57] ABSTRACT

An improved sealing composition for use between alumina ceramic parts, or between alumina ceramic and refractory metal, is based on 47 weight percent $Al_2O_3$, 37 weight percent CaO and 16 weight percent BaO. Up to 3 weight percent $B_2O_3$ may be added for improved wetting and flow characteristics. The composition has a lower liquidus temperature (1325° C.) than an otherwise similar one previously used which included 5% MgO, and its thermal expansion coefficient is less affected by dissolved $Al_2O_3$. As a result, a closer thermal match with alumina ceramic can be maintained during seal processing and the rejection rate is reduced.

13 Claims, 4 Drawing Figures

FIG. 1
FIG. 2
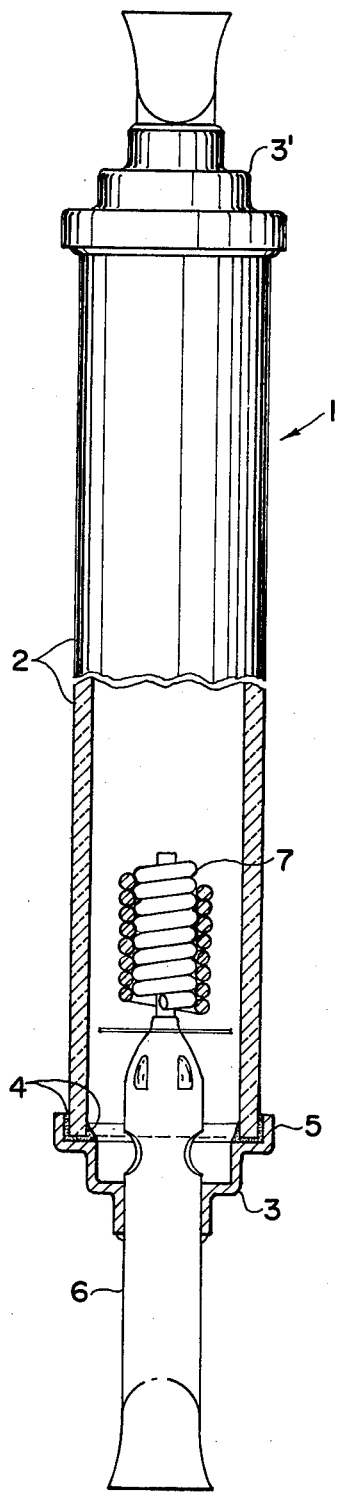
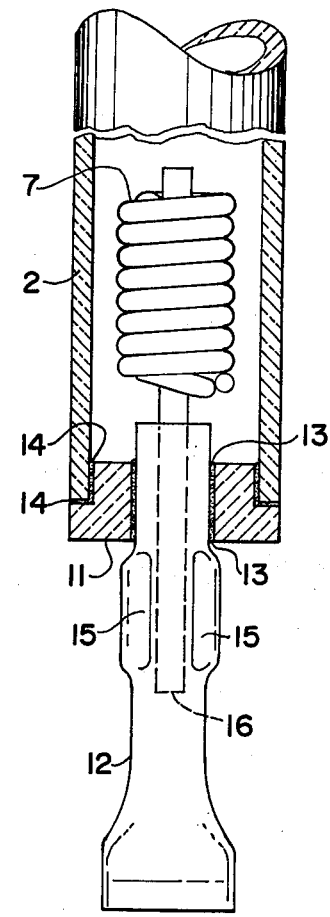

ALUMINA, CALCIA, BARIA SEALING COMPOSITION OPTIONALLY MODIFIED WITH $B_2O_3$

This application is a continuation-in-part of our copending application Ser. No. 851,439, filed Nov. 14, 1977 and now abandoned.

The invention relates to a glassy sealing composition of particular value in bonding to alumina ceramic, that is, bonding ceramic to ceramic or ceramic to metal in electric lamp manufacture.

BACKGROUND OF THE INVENTION

Alumina ceramic, either translucent or clear, is particularly suitable as an envelope material for high intensity alkali metal vapor lamps such as high pressure sodium vapor lamps, because it withstands the attack of the vapors of the alkali metals even at high temperatures. In making such lamps, end closures which support the electrodes must be bonded and hermetically sealed to a ceramic tube and a sealing glass or composition is used for this purpose. The closures may take the form of metal end caps which provide direct electrical connection to the electrodes, or of a ceramic plug in which case a metal conductor must be sealed through the plug to provide the electrical connection. The metal having a coefficient of expansion closest to that of alumina ceramic is niobium and it is the one generally used either for the end cap or for the inlead in the case of a ceramic plug.

Desirable properties of a sealing composition are favorable liquidus temperature, wide sealing range, ability to form glasses when melted and cooled rapidly, and stability in the presence of alkali metal vapors at elevated temperatures. The liquidus temperature must of course be above the highest to be encountered during operation of the lamp, but preferably not much above such maximum in order to facilitate manufacture and assure longer furnace life. A composition meeting the foregoing requirements is disclosed in U.S. Pat. No. 3,588,577 McVey et al. It is centered on 45 wt% $Al_2O_3$, 36 wt% CaO, 14 wt% BaO, and 5 wt% MgO. This composition, referred to as G45, has been widely used by applicants' assignee in the commercial manufacture of high pressure sodium vapor lamps of the kind using niobium metal end caps. As in most manufacturing operations, some defective products, cracked or leaky seals in this case, are produced when using the G45 sealing composition. Such defective products must be rejected and the proportion thereof is commonly referred to as the shrinkage rate. When the G45 composition is used to seal ceramic end plugs, a somewhat higher shrinkage has been experienced.

The object of the invention is to provide a new composition for sealing metal or ceramic to alumina ceramic and which is superior to the G45 composition. In particular a composition is desired providing a lower shrinkage rate when sealing alumina ceramic parts together in electric lamp manufacture.

SUMMARY OF THE INVENTION

In accordance with the invention we provide an improved sealing glass or composition for use between alumina ceramic parts or between alumina ceramic and a refractory metal. It is based on 47 wt% $Al_2O_3$, 37 wt% CaO and 16 wt% BaO; these proportions result from reformulating the G45 composition after eliminating its 5 wt% MgO component. A small proportion of $B_2O_3$, not in excess of 3% by weight, may be added to improve the wetting and flow characteristics of the glass and to ease the severity of the prescription for use. The new composition, known as G47, has the following properties which indicate several advantages over the G45 composition.

1. The liquidus temperature of G47 at 1325° C. is 95° C. lower than that of G45 at 1420°, making possible a lower sealing temperature.
2. $Al_2O_3$ is less soluble and dissolves more slowly into G47 than into G45 (12.5% vs. 30% by weight at 1550° C.)—hence fewer problems due to seal glass-alumina ceramic interactions.
3. G47, unlike G45, does not form the thermally incompatible phase $12CaO.7Al_2O_3$ when molten G47 containing dissolved $Al_2O_3$ is cooled—hence a stronger bond.
4. The thermal expansion coefficient of G47 is less affected by dissolved $Al_2O_3$ than is that of G45, so that a closer thermal expansion match with alumina ceramic can more easily be maintained during seal processing.

DESCRIPTION OF DRAWINGS

FIG. 1 shows an alumina ceramic lamp in which the G47 composition of the invention is used to seal a metal end cap.

FIG. 2 shows an alumina ceramic lamp in which the G47 composition is used to seal a ceramic end plug and a metal lead through the plug.

DESCRIPTION OF PREFERRED EMBODIMENT

Figure 3:
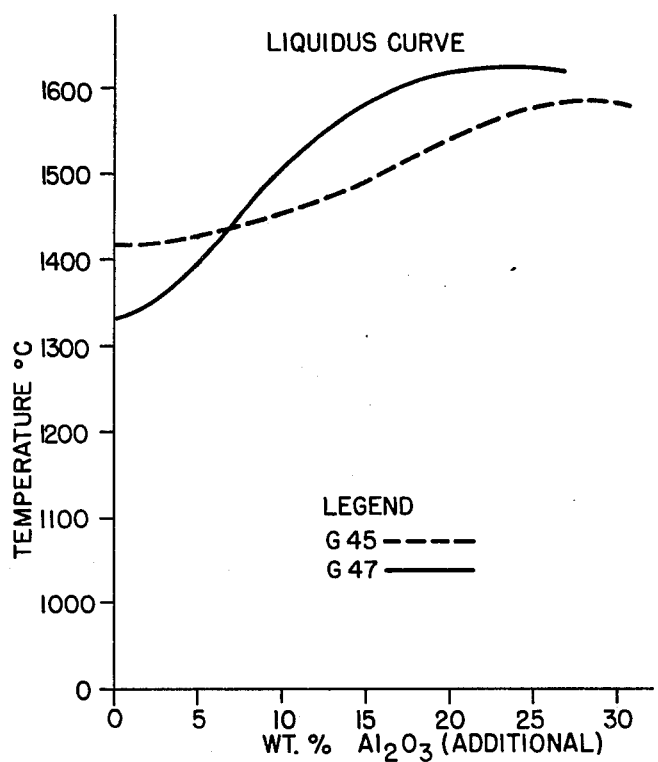
FIG. 3 compares the liquidus curve of G47 with that of G45.

A typical application of the sealing composition of the invention in sealing an electric lamp is illustrated in FIG. 1. An arc tube 1 comprises an envelope 2 of ceramic tubing consisting of sintered high density polycrystalline alumina. A central portion of the tube has been cut out to shorten the figure, and the internal construction can be seen in the sectioned lower portion. By way of example, in a 400-watt size of a lamp, the arc tube is about 110 mm long by 7.5 mm in diameter.

The ends of the tube are closed by thimble-like niobium closures or end caps 3,3' which are hermetically sealed to the ceramic by means of the G47 sealing composition of the invention. The sealing composition is indicated at 4 and is located within the space between the expanded shoulder portion 5 of the end cap and the side and end of the ceramic tube. A niobium tube 6 penetrates into the thimble and is used as an exhaust tube during manufacture after which it is closed off. A thermionic electrode 7 is mounted in each end of the arc tube and is supported by the niobium tube 6. The filling of the arc tube may consist of a sodium mercury amalgam dose and an inert gas such as xenon, or a neon-argon mixture to facilitate starting. The arc tube is not operated in air but is mounted within an evacuated outer jacket (not shown) which prevents oxidation of the metal end caps.

FIG. 2 shows another typical application of our sealing composition in a similar lamp using a ceramic plug for the end closure. One end only of the lamp is shown and the construction illustrated is that of copending application Ser. No. 747,552—McVey, filed 12/6/76 and similarly assigned, now U.S. Pat. No. 4,065,691. The end of the alumina tube 2 is closed by a shouldered alumina ceramic plug 11 (sometimes referred to as a 'manhole' plug) having a central aperture through which extends a thin-walled niobium tube 12 which serves as an exhaust tube and as an inlead. The tube extends but a short distance through the plug and is hermetically sealed therethrough by sealing composition indicated at 13. The plug in turn has its neck portion penetrating into ceramic envelope 2 whose end butts against the shoulder portion of the plug. A hermetic seal is effected between the two parts by sealing composition indicated at 14. In this lamp construction the electrode 7 is supported by crimping exhaust tube 12 at 15 so as to clamp the electrode shank 16 over an appreciable length.

Sample Preparation and Characterization

When the G47 sealing compositions used used in the above-described lamp seals were prepared, G45 compositions were also prepared for comparison purposes. Appropriately weighed reagent grade chemicals consisting of $Al_2O_3$, $CaCO_3$, $BaCO_3$, and $MgO$ where called for, were mixed and blended in acetone and then melted in platinum crucibles. The samples were then crushed and milled to a fine powder and a quantity pressed into a sealing washer of appropriate size.

For studies of $Al_2O_3$ solubility and recrystallization, appropriate amounts of $Al_2O_3$ were mixed with G45 and with G47 compositions. Several portions of these samples were melted to a clear liquid in platinum crucibles. The liquid was then quenched to a clear glass by plunging the outside of the crucible into cold water. To characterize the recrystallization phases, the glass fragments thus produced were heat treated overnight in platinum crucibles at temperatures between 1200° and 1450° C. The phases present in various compositions were determined by petrographic microscopic examination as well as by powder X-ray diffraction patterns.

The solubility of $Al_2O_3$ in the compositions as a function of temperature was measured by melting the composition with various amounts of $Al_2O_3$ in a strip furnace equipped with an optical pyrometer viewed through a telescope. Instantaneous coefficient of thermal expansion $\alpha_T$ was measured by a dilatometer using platinum as a standard.

Solubility of $Al_2O_3$ In Composition

While the initiation of melting or solidus point occurs at about 1275° C. for both compositions, the liquidus temperature of G47 is about 1325° C., as against 1420° C. for G45. Samples of G47 and of G45, both with added $Al_2O_3$ were heated in between the respective solidus and liquidus points. The liquidus temperature increases with $Al_2O_3$ content as is seen in FIG. 3 wherein the curves show the maximum solubility of $Al_2O_3$ as a function of temperature assuming complete thermal equilibrium. Samples equilibrated between solidus and liquidus points were examined by X-ray diffraction analysis. In the case of G47, $Al_2O_3$ was not found as a crystalline phase, indicating its complete solution into the composition or its crystallization products. The process of solution, viewed through the pyrometer telescope, appeared sluggish. In addition when samples which had been quenched from temperatures as high as 50° to 70° C. above their liquidus points were viewed under a petrographic microscope, numerous entrapped air bubbles were observed: this indicates high viscosity of the glass or sealant The lower liquidus temperature of the G47 composition according to the invention permits ceramic to ceramic or ceramic to metal seals to be made at temperatures around 1450° C. By contrast, the current practice when using G45 as the sealant has been to use a temperature of around 1550° C. The lowering of the sealing process temperature has certain definite advantages. Firstly, it reduces manufacturing difficulties and economizes on fuel. Secondly, it causes less thermal stress and mechanical tension in the seal joint area upon cooling after the sealing operation.

In making a seal, some $Al_2O_3$ from the ceramic goes into solution in the sealant. The lower sealing temperature, the greater viscosity of the G47 melt and the lower solubility of $Al_2O_3$ therein all combine to reduce the amount of $Al_2O_3$ from the ceramic which goes into solution in our sealant. The invention thereby appreciably reduces problems caused by sealing composition/alumina ceramic interaction.

Crystallization Behavior

The G47 sealing composition, unlike G45, does not form the thermally incompatible phase $12CaO.7Al_2O_3$ when molten composition which contains additional dissolved $Al_2O_3$ is cooled. In samples of G47 and G45 compositions containing additional $Al_2O_3$ heated overnight at 850° C., X-ray diffraction patterns showed moderately intense recognizable peaks of the 12 CaO.-7$Al_2O_3$ phase only in the G45 composition. G47 composition containing additional $Al_2O_3$ to the extent of 15% by weight or more showed several peaks indicating presence of $BaAl_2O_4$. However, in no case of recrystallized or cooled G47 samples was metastable crystallization of $12CaO.7Al_2O_3$ observed. We have concluded from this that the absence of MgO from the G47 composition according to the invention accomplishes its intended purpose: recrystallization of the undesirable $12CaO.7Al_2O_3$ phase is successfully inhibited.

Thermal Expansion of G47 with Added $Al_2O_3$

Figure 4:
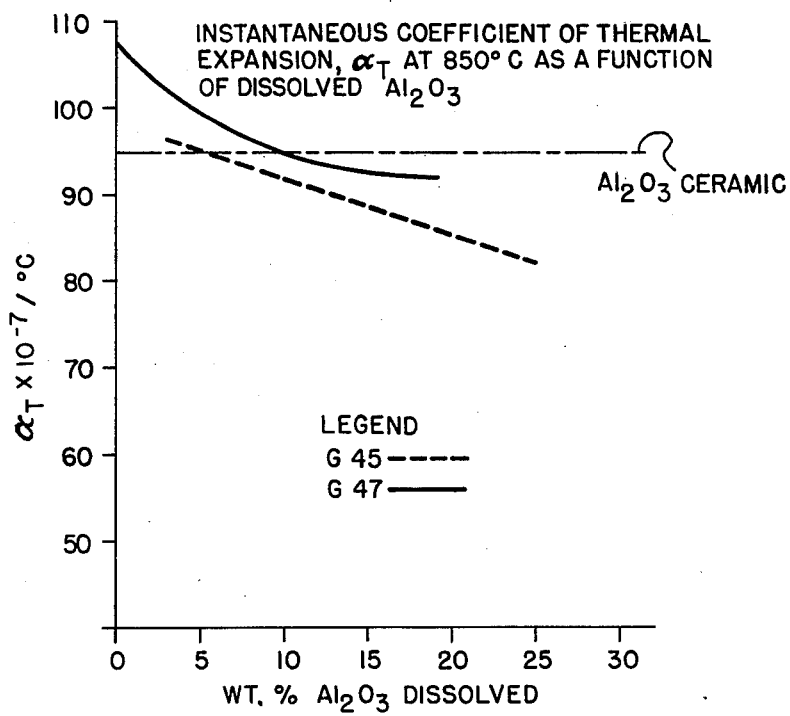
FIG. 4 compares the instantaneous coefficient of thermal expansion of G47 with that of G45 at 850° C. as a function of dissolved $Al_2O_3$.

The curves in FIG. 4 represent the coefficient of instantaneous thermal expansion, $\alpha_T$, as a function of dissolved $Al_2O_3$ at a temperature of 850° C. This temperature is approximately that of the seals during operation of the lamp. In the parent case hereof, the coefficient of the G45 composition mistakenly showed a sudden reversal in direction at about 15 wt% $Al_2O_3$; this error occurred in computing the data and it has now been corrected. The instantaneous coefficient of thermal expansion of polycrystalline alumina ceramic at 800° C. is $95 \times 10^{-7}/°$ C. and is indicated in the figure by a light dash dot line. It will be observed that the $\alpha_T$ value of a G47 sealing composition is less influenced by the dissolved additional $Al_2O_3$ content than is the G45 sealing composition. In particular over the range of additional dissolved alumina from 5 to 15 percent which includes the practical sealing range, the coefficient of instantaneous thermal expansion $\alpha_T$ of the G47 composition varies only from $97.5 \times 10^{-7}/°$ C. to $93.5 \times 10^{-7}/°$ C. This provides a close thermal match straddling the expansion coefficient of alumina ceramic at $95 \times 10^{-7}/°$ C.

Advantages of G47 Composition

In studies of seal failures in ceramic/ceramic seals using the prior art G45 composition as a sealant, it was observed that the failure mode is partly due to microcrack formation originated by thermal-expansion mismatch between the arc tube and the seal-area composite (sealant+ceramic), as well as between different parts of the seal itself. We concluded that the expansion mismatch is caused by solution of $Al_2O_3$ in the sealant melt followed by recrystallization of the thermally incompatible phase $12CaO.7Al_2O_3$. The greater shrinkage in ceramic-to-ceramic seals would be due at least in part to the dissolution of more $Al_2O_3$ into the sealant inasmuch as $Al_2O_3$ can move into the sealant from both ceramic surfaces in contact with it. This would explain the greater shrinkage rate was observed with the ceramic plug lamp design of FIG. 2 when using G45 sealing composition.

When the data for solubility, thermal expansion and rate of dissolution of additional $Al_2O_3$ are compared together, additional advantages of the G47 sealing composition emerge. In a practical sealing operation, it is unlikely that complete thermal equilibrium and maximum possible solubility of $Al_2O_3$ in the molten sealant are achieved. In a typical sealing schedule, for example about 5 minutes of soaking time at 1550° C. when using the prior G45 sealant, a true equilibrium in the seal area is probably not achieved. On account of the rapid dissolution of $Al_2O_3$ in the G45 melt, it can be assumed that locally about 20 to 25 weight percent of $Al_2O_3$ from the ceramic tube is dissolved in the sealant. Then on cooling the metastable phase of $12CaO.7Al_2O_3$ appears, causing a signficant decrease from the minimum acceptable value of thermal expansion of the seal/ceramic composite. This is borne out by X-ray diffraction analysis of seal/ceramic composite and from photomicrographs of sectioned seals. On the other hand, under similar seal process conditions using the G47 composition as the sealant, only about 10 to 12% or less alumina—due to the sluggish process of dissolution with G47 as the sealant—is dissolved. In addition, because of the high viscosity of the melt, little crystallizatin takes place on cooling, making the resulting seal a close match to the alumina ceramic in thermal expansion.

Thus by reformulating the prior art G45 sealing composition to eliminate the 5 wt% of MgO, the invention has achieved an improved sealing composition which allows seals to be made at a lower temperature and wherein the sealant has a closer thermal expansion match with alumina ceramic. Our new G47 sealing composition is advantageous for use with both niobium end cap lamps as shown in FIG. 1, and ceramic plug lamps as shown in FIG. 2. In tests of seals using ceramic plugs, a substantial reduction in the shrinkage rate was achieved relative to the prior art G45 composition.

While the preferred proportions of the G47 sealing composition are 47 wt% $Al_2O_3$, 37 wt% CaO and 16 wt% BaO, the benefits of the invention will be substantially realized with proportions by weight within the following limits:

CaO . . . 32 to 42%,
BaO . . . 10 to 19%,
MgO . . . up to 1%,
$Al_2O_3$ . . . the balance making 100%.

It will be appreciated that even when one starts with sealing composition in the preferred proportions, those will not be the proportions in the sealant after melting and congealing in place as binder in a sealed lamp arc tube. The sealant will contain additional $Al_2O_3$ which dissolved into it from the alumina ceramic, for instance up to 20 wt% additional $Al_2O_3$. The precise amount will depend of course upon the nature of the joint and the temperature and soaking time used in cementing or sealing the parts together.

The avoidance of the $12 CaO.7Al_2O_3$ phase when the sealant cools and congeals is most effectively achieved by completely eliminating MgO from the composition. However the benefits of the invention will be substantially realized notwithstanding the presence of MgO in the composition up to about 1 wt%. This tolerance is fortunate because it permits the use of components which may contain MgO as impurity.

Since the filing of the parent application, we have determined, partly through manufacturing experience, that the wetting and flow characteristics of our G47 sealing composition can be improved and the criticality of the prescription for use can be reduced by adding to the composition a small amount of boric oxide $B_2O_3$, not over 3% by weight.

In sealing alumina ceramic envelopes, the prescription for use of the sealing composition governs sealing temperature, soak time and seal geometry. The prescription is optimized for a given furnace and must be strictly adhered to. By way of example, the prescription may specify raising the furnace temperature to 1550° C., holding this temperature for a 2 minute interval commonly referred to as soak time, and then allowing the furnace to cool. Naturally, for ease of manufacture, it is desirable to have as large a tolerance as possible in respect of the use prescription. We have found that the tolerance can be improved by adding a small proportion of $B_2O_3$, suitably from 1 to 3% by weight, and preferably about 2% by weight, to the composition.

The wettability of the composition, that is, its ability at a given temperature to wet the ceramic or the metal which it contacts and to seal hermetically thereto, is also very important. Wetting increases with soak temperature, but increasing the temperature increases the rate of solution of $Al_2O_3$ into the composition from the ceramic, which creates other problems. The addition of a small percentage of $B_2O_3$ within the stated limits improves the wettability of the composition without requiring an increase in the soak temperature.

In order to characterize crystallization of the glass modified according to the present continuation-in-part, two compositions were prepared having the following proportions by weight: (1) CaO 36%, BaO 16%, $B_2O_3$ 2% and $Al_2O_3$ 46%; and (2) CaO 38%, BaO 11% and $Al_2O_3$ 51%. A qualitative evaluation of the growth of the $12 CaO.7Al_2O_3$ phase during the sealing operation was made because it significantly influences the thermal expansion of the final seal. Glass samples were obtained by melting the two compositions at 1500° C. and a small portion of each glass was heat-treated for 16 hours at at 850° C. and examined. No crystallization of the $12CaO.7Al_2O_3$ phase was observed under X-ray diffraction analysis (XRD). Cubic $12CaO.7Al_2O_3$ phase crystallized from and embedded in a glassy matrix can be detected by its square outline when viewed under a binocular microscope; none was detected in the samples. To investigate the role of additional $Al_2O_3$ on the crystallization of the seal glass, 5% by wt. of additional $Al_2O_3$ was dissolved in glass composition #2 and the sample heat-treated for 16 hours at 850° C. Again no growth of the $12CaO.7Al_2O_3$ phase was observed under XRD or under a binocular microscope. The experiment was repeated with heat treatment of the sample for 16 hours at 1200° C., with the same net result.

We have tested the effect of small additions of $B_2O_3$, not over 3% by weight, on the thermal expansion coefficient of G47 glass embodying the invention. The mean coefficient in the temperature range from 25° to 600° C. is $87 \times 10^{-7}$/° C. for 1 wt% $B_2O_3$, and $88 \times 10^{-7}$/° C. for 2 wt% $B_2O_3$. This compares with a mean coefficient of $86 \times 10^{-7}$/° C. for polycrystalline alumina ceramic. The shift in the coefficient by reason of added $B_2O_3$ is insignificant.

We have concluded from the foregoing that lowering the BaO limit to 10% by wt. does not significantly alter the crystallization behavior of our G47 seal glass, and that addition of up to 3% by wt. $B_2O_3$ achieves the desired increase in wettability without undesirable side effects.

A preferred composition and the allowable range, embodying the invention, both expressed in weight percent and utilizing the boric addition is as follows:

|  | Preferred Composition | Allowable Range |
|---|---|---|
| CaO | 36% | 32 to 42% |
| BaO | 16% | 10 to 19% |
| $B_2O_3$ | 2% | 0 to 3% |
| MgO | None | 0 to 1% |
| $Al_2O_3$ | 46% | Balance to make up 100% |

By this new feature of the invention improved wetting and flow characteristics are achieved, while yet avoiding MgO and its detrimental effects on the thermal expansion coefficient of the composition.

What we claim as new and desire to secure by Letters Patent of the United States is:

1. An article of manufacture comprising an alumina ceramic body having a part of ceramic or refractory metal bonded thereto by a sealant, said sealant being the end product of melting and congealing in place a composition consisting essentially of the following proportions by weight:
   CaO . . . 32 to 42%,
   BaO . . . 10 to 19%,
   MgO . . . up to 1%,
   $Al_2O_3$ . . . balance to make up 100%.

2. An article of manufacture as in claim 1 wherein the composition contains substantially no MgO.

3. An article of manufacture as in claim 1 wherein the composition contain substantially no MgO and has approximate proportions by weight of 37% CaO, 16% BaO and 47% $Al_2O_3$.

4. A sealed electric lamp comprising an envelope formed of an alumina ceramic tube having end closures, a pair of electrodes and a filling of an ionizable medium therein, and a sealant bonding at least one end closure to said tube, wherein the improvement resides in said sealant being the end product of melting and congealing in place a composition consisting essentially of the following proportions by weight:
   CaO . . . 32 to 42%
   BaO . . . 13 to 19%,
   MgO . . . up to 1%,
   $Al_2O_3$ . . . balance to make up 100%.

5. A sealed electric lamp as in claim 4 wherein said one end closure is a niobium cap.

6. A sealed electric lamp as in claim 4 wherein said one end closure is an alumina ceramic plug.

7. A sealed electric lamp as in claim 4 wherein said one end closure is an alumina ceramic plug and wherein the composition contains substantially no MgO and has approximate proportions by weight of 37% CaO, 16% BaO and 47% $Al_2O_3$.

8. An article of manufacture comprising an alumina ceramic body having a part of ceramic or refractory metal bonded thereto by a sealant, said sealant being the end product of melting and congealing in place a composition consisting essentially of the following proportions by weight:
   CaO . . . 32 to 42%,
   BaO . . . 10 to 19%,
   $B_2O_3$ . . . up to 3%,
   MgO . . . up to 1%,
   $Al_2O_3$ . . . balance to make up 100%.

9. An article of manufacture as in claim 8 wherein the composition contains substantially no MgO and has approximate proportions by weight of 36% CaO, 16% BaO, 2% $B_2O_3$ and 46% $Al_2O_3$.

10. A sealed electric lamp comprising an envelope formed of an alumina ceramic tube having end closures, a pair of electrodes and a filling of an ionizable medium therein, and a sealant bonding at least one end closure to said tube, wherein the improvement resides in said sealant being the end product of melting and congealing in place a composition consisting essentially of the following proportions by weight:
   CaO . . . 32 to 42%,
   BaO . . . 13 to 19%,
   $B_2O_3$ . . . up to 3%,
   MgO . . . up to 1%,
   $Al_2O_3$ . . . balance to make up 100%.

11. A sealed electric lamp as in claim 10 wherein said one end closure is a niobium cap.

12. A sealed electric lamp as in claim 10 wherein said one end closure is an alumina ceramic plug.

13. A sealed electric lamp as in claim 10 wherein said one end closure is an alumina ceramic plug and wherein the composition contains substantially no MgO and has approximate proportions by weight of 36% CaO, 16% BaO, 2% $B_2O_3$ and 46% $Al_2O_3$.

* * * * *